March 26, 1957   W. G. CLARK   2,786,574
GRADER
Filed Jan. 19, 1954   6 Sheets-Sheet 1
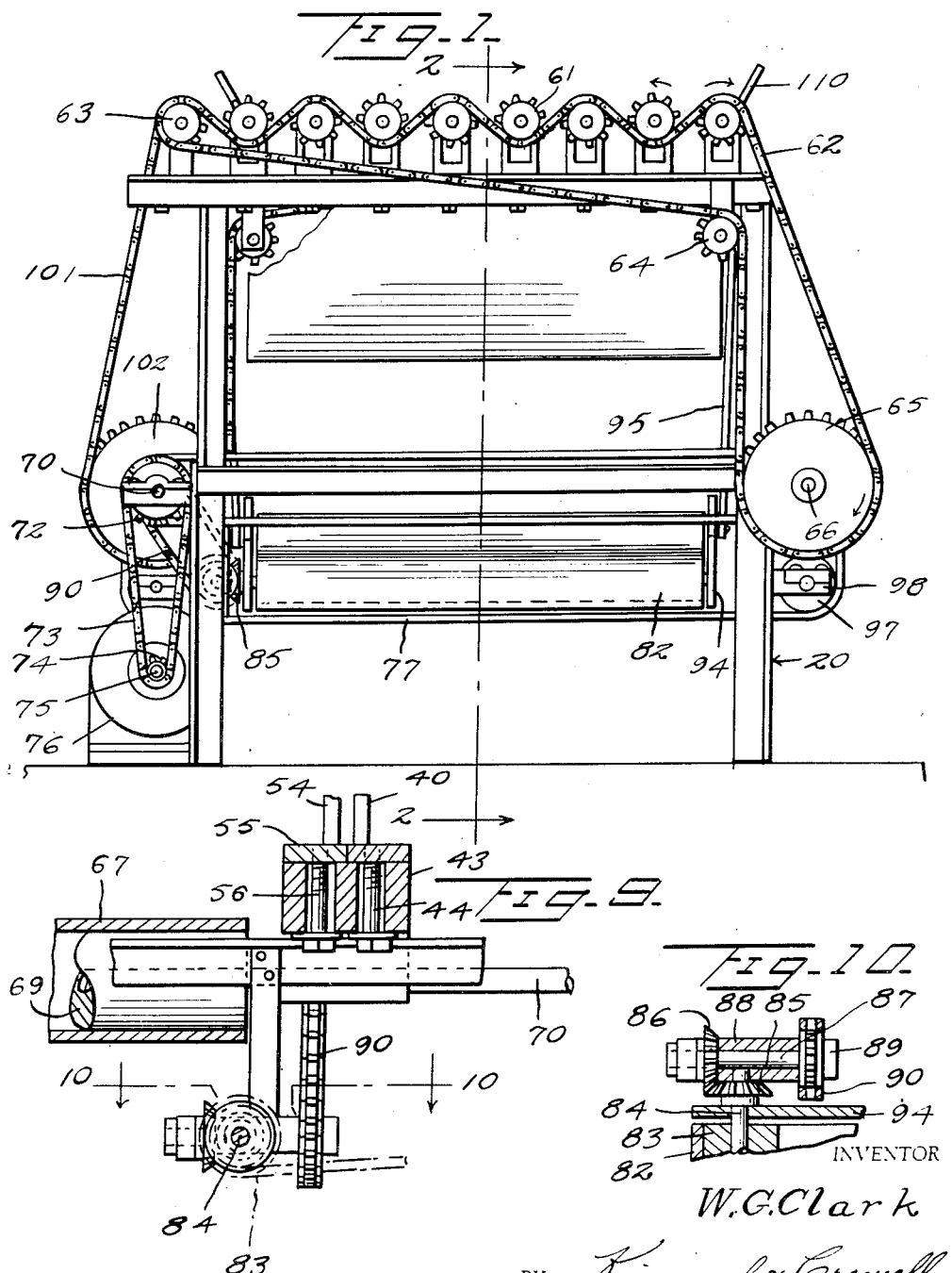

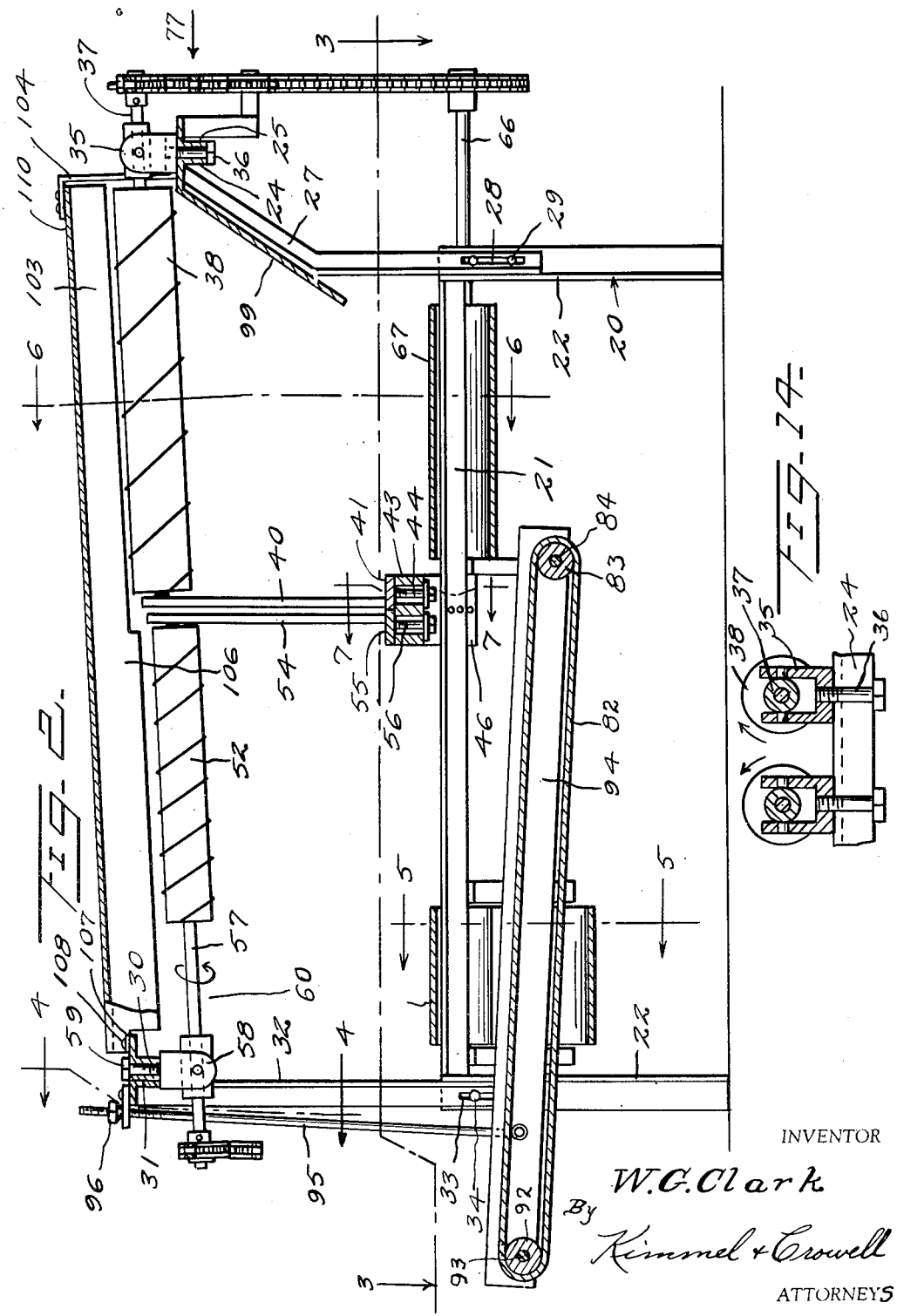

March 26, 1957
W. G. CLARK
2,786,574
GRADER
Filed Jan. 19, 1954
6 Sheets-Sheet 3
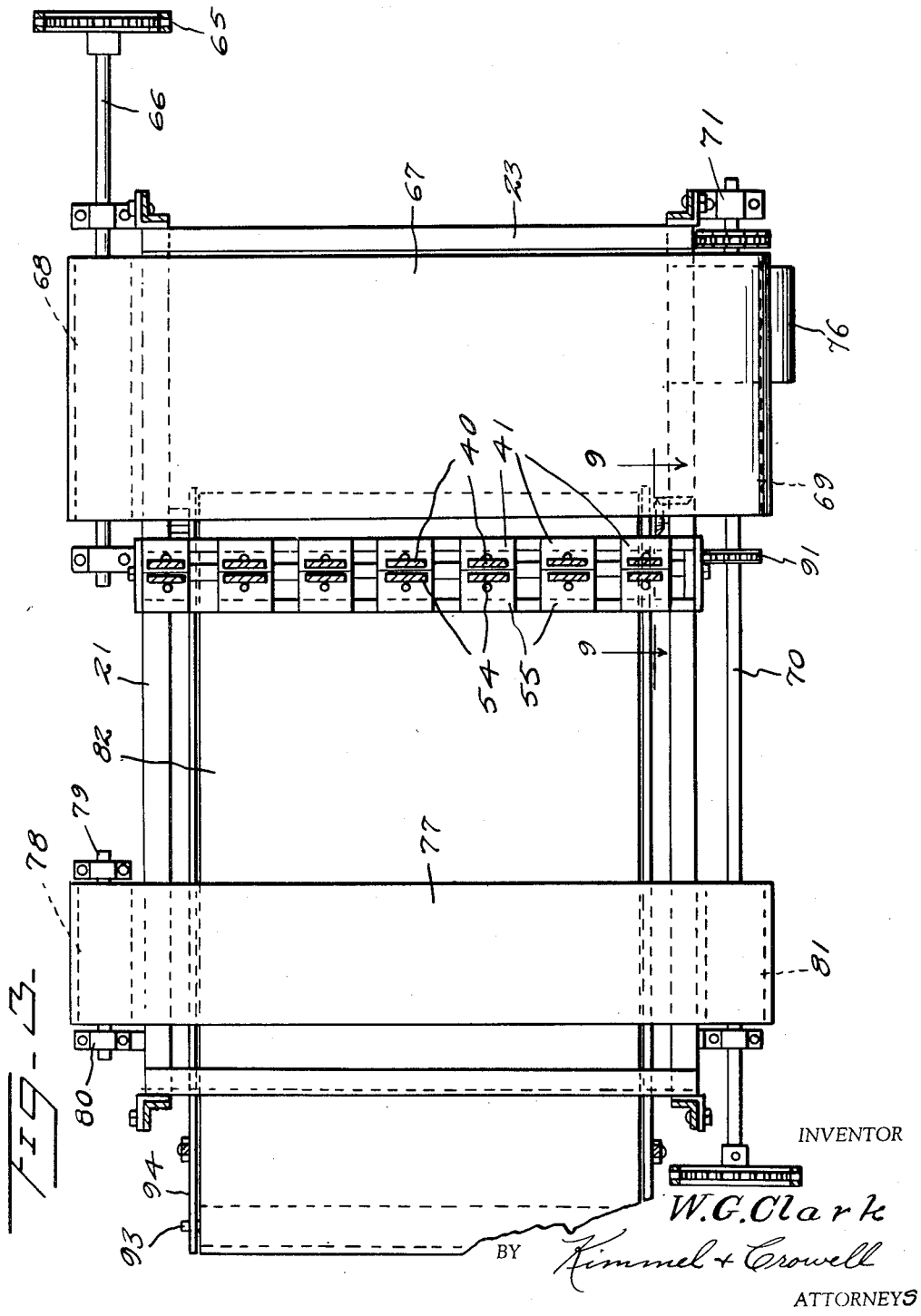

March 26, 1957 W. G. CLARK 2,786,574
GRADER
Filed Jan. 19, 1954 6 Sheets-Sheet 4
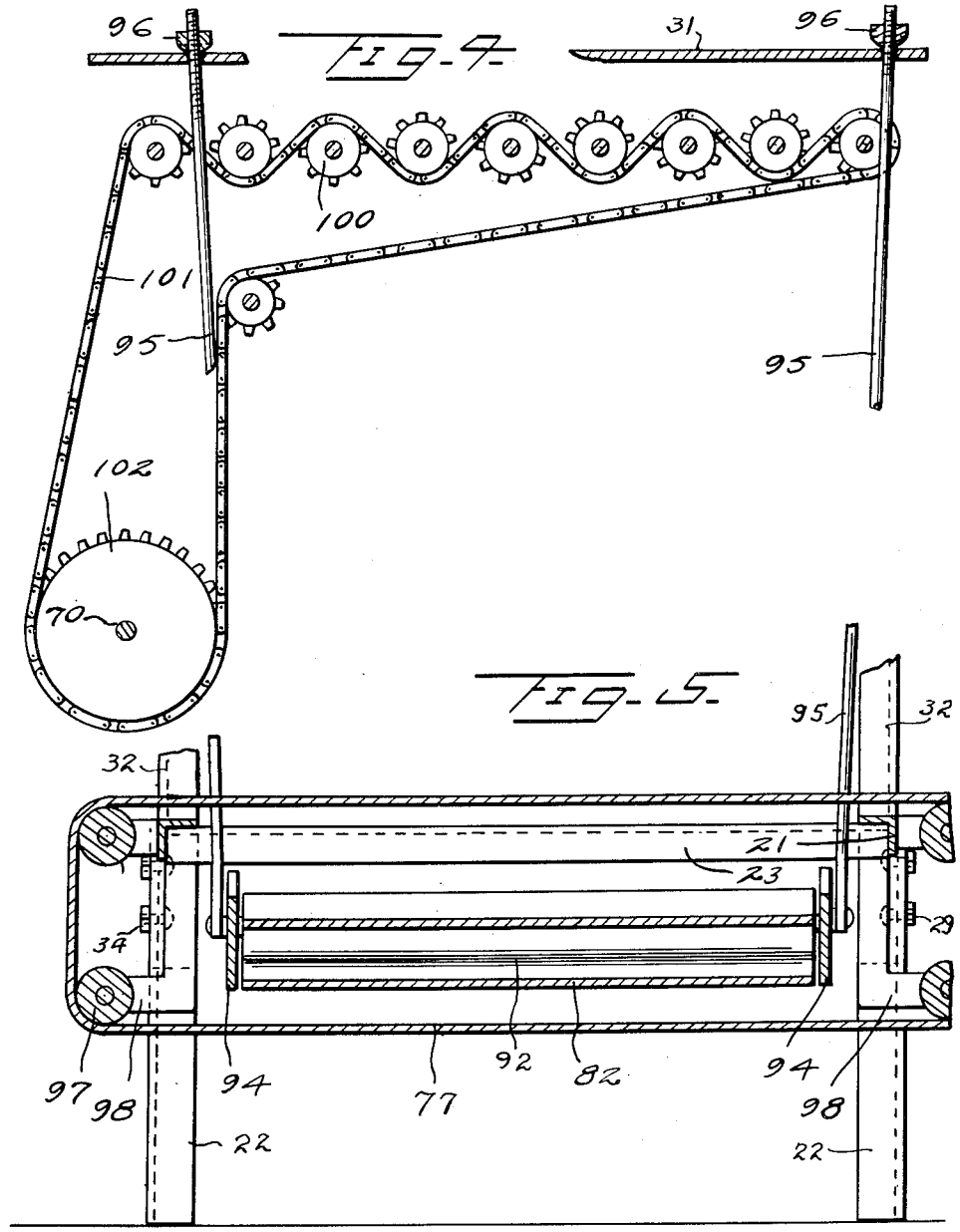
INVENTOR
W.G.Clark
BY Kimmel & Crowell
ATTORNEYS March 26, 1957 W. G. CLARK 2,786,574
GRADER
Filed Jan. 19, 1954. 6 Sheets-Sheet 5
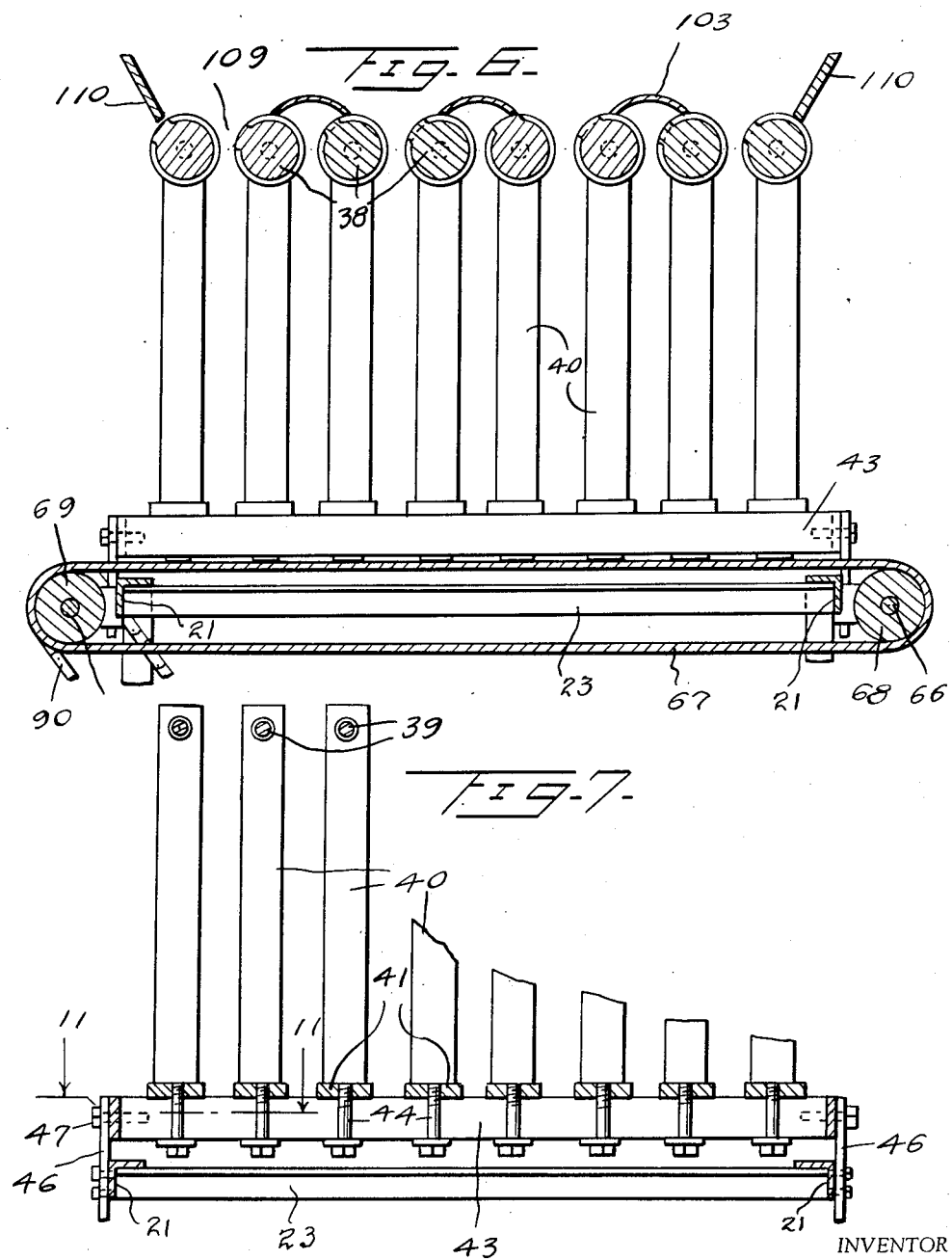
INVENTOR
W. G. Clark
BY Kimmel & Crowell
ATTORNEYS

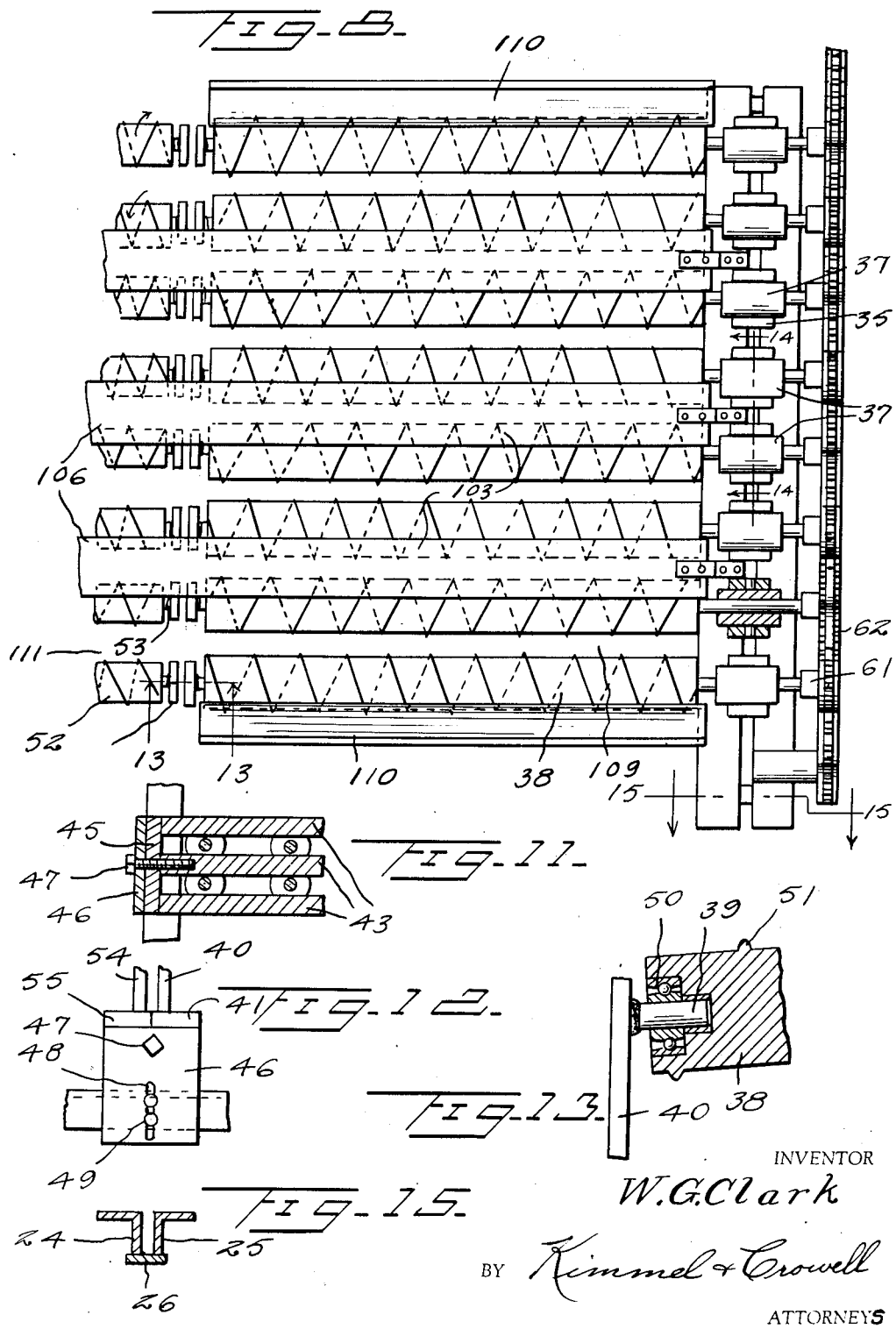

United States Patent Office 2,786,574
Patented Mar. 26, 1957

2,786,574

GRADER

Warren G. Clark, Cheriton, Va.

Application January 19, 1954, Serial No. 404,948

5 Claims. (Cl. 209—107)

This invention relates to a potato grading machine.

An object of this invention is to provide a grading machine which will grade sweet potatoes, peppers or other articles without injury thereto.

Another object of this invention is to provide a grading machine formed of a plurality of pairs of grading rollers arranged on an incline with one series of upper rollers, and a second series of lower rollers, with a transverse conveyor below each series of rollers.

A further object of this invention is to provide a grading machine which is relatively simple in construction and will accurately grade the articles.

A further object of this invention is to provide in a grading machine of this type, a longitudinal conveyor for the large articles, with an improved means for adjustably supporting the discharge end of the longitudinal conveyor whereby the inclination thereof may be varied as may be desired.

With the above and other objects in view, my invention consists in the arrangement, combination and details of construction disclosed in the drawings and specification, and then more particularly pointed out in the appended claims.

In the drawings:

Figure 1 is a detailed end elevation of a grading machine constructed according to an embodiment of this invention.

Figure 2 is a sectional view taken on the line 2—2 of Figure 1.

Figure 3 is a sectional view taken on the line 3—3 of Figure 2.

Figure 4 is a fragmentary sectional view taken on the line 4—4 of Figure 2.

Figure 5 is a fragmentary sectional view taken on the line 5—5 of Figure 2.

Figure 6 is a fragmentary sectional view taken on the line 6—6 of Figure 2.

Figure 7 is a fragmentary sectional view taken on the line 7—7 of Figure 2.

Figure 8 is a fragmentary plan view of the rear portion of the machine.

Figure 9 is a fragmentary sectional view taken on the line 9—9 of Figure 3.

Figure 10 is a fragmentary sectional view taken on the line 10—10 of Figure 9.

Figure 11 is a fragmentary sectional view taken on the line 11—11 of Figure 7.

Figure 12 is a fragmentary side elevation showing the intermediate roller supporting means.

Figure 13 is a fragmentary sectional view taken on the line 13—13 of Figure 8.

Figure 14 is a fragmentary sectional view taken on the line 14—14 of Figure 8.

Figure 15 is a sectional view taken on the line 15—15 of Figure 8.

Referring to the drawings, the numeral 20 designates generally a base frame which is formed of a pair of longitudinal frame bars 21 secured at the opposite ends thereof to legs 22. End frame bars 23 are secured between the upper ends of the legs 22.

A rear pair of angle bars 24 and 25 are disposed above the base frame 20, and the bars 24 and 25 have the vertical sides thereof secured together by connecting member 26. The bars 24 and 25 have fixed thereto obtusely angled supporting bars 27 which engage on the inner side of the angles of the legs 22, and each bar 27 is formed with an elongated opening 28 through which a pair of bolts 29 engage.

The bolts 29 in the slots 28 provide means whereby the supporting bars 27 may be vertically adjusted to adjust the height of the connected angle bars 24 and 25.

A forward pair of angle bars 30 and 31 are disposed at the forward end of the frame structure and are secured to the upper ends of a pair of vertical supporting angle bars 32. The angle bars 32 are provided with elongated slots 33 through which fastening members 34 engage, and the angle bars 32 engage on the inside of the angles of the forward legs 22.

A plurality of swivel bearings 35 are secured to the upper or rear pair of angle bars 24 and 25 by means of bolts 36. Each bearing 35 has rotatable therethrough a roller carrying shaft 37 which projects into one end of a grading roller 38. The rollers 38 are arranged in pairs and the securing means 36 for the bearings 35 provide a means whereby the members of each pair of rollers 38 may be adjusted toward or away from each other to permit the passage therebetween of articles, such as potatoes or the like, of a particular size.

The inner or lower ends of the rollers 38 are rotatably mounted on stub shafts 39 which are carried by upright supporting bars 40. The bars 40 have base plates 41 secured to their lower ends, and the plates 41 are secured to a plurality of transversely disposed supporting frame bars 43.

In the present instance there are three of these frame bars 43, and a securing and adjusting bolt 44 extends between one pair of bars 43. The bars 43, as shown in Figure 11, are secured together at their opposite ends by means of a plate 45, and a supporting plate 46 is secured by fastening means 47 to the plate 45. The bars 43 may be angularly adjusted or rotated about the bolts 47 as the angular relation of the rollers and the height thereof are adjusted.

Plate 46 engages on the outer side of a side frame member 21, and plate 46 is formed with an elongated opening 48 through which a pair of adjusting bolts 49 engage.

The stud 39 engages in a ball bearing 50 disposed in the inner end of the roller 38 so that the rear end of roller 38 may be vertically adjusted without adjustment of the inner or forward end of roller 38. Each roller 38 is provided with a spiral rib 51 so as to provide for forward movement of the material upon rotation of each roller 38.

As disclosed in Figure 8, there is a rear or upper series of rollers 38, and extending from the lower or inner ends of the rollers 38 there is a second series of rollers 52 which are similar to rollers 38.

The rollers 52 are rotatably mounted at their upper inner ends on studs 53 carried by supporting bars 54 which are fixed to base plates 55. The base plates 55 are adjustably secured by fastening means 56 to the transverse supporting bars 43.

The lower or forward ends of the rollers 52 have extending therefrom shafts 57 which are journalled in depending swivel bearings 58 secured by adjustable fastening means 59 to the lower or forward angle bars 30 and 31.

The space 60 between the lower ends of the rollers 52 and the bearings 58 provide a grading space for the passage of relatively large articles, such as potatoes or the like.

The upper or rear shafts 37 have fixed thereto sprockets 61 about which a driving chain 62 engages. The chain 62 engages over one sprocket 37 and under the next adjacent sprocket so that adjacent pairs of shafts 37 and rollers 38 will rotate in opposite direction.

At one side of the frame and at the rear thereof there is disposed an idler sprocket 63 about which the chain 62 engages, and a second idler sprocket 64 is disposed at the opposite side of the machine and below the sprockets 37.

The chain 62 is trained about a driving sprocket 65 which is secured to a shaft 66 rotatably carried by the adjacent side of the base frame 20.

A rear transverse endless conveyor 67 is disposed beneath the rear rollers 38 and engages about a drum 68 mounted on shaft 66. The conveyor belt 67 also engages about a drum 69 mounted on a drive shaft 70 journalled in bearings 71.

The shaft 70 has fixed thereto a sprocket 72 about which a chain 73 engages, and the chain 73 engages a sprocket 74 carried by a shaft 75. The shaft 75 is connected through a reduction gearing to a power member 76.

A forward transverse conveyor 77 is disposed beneath the grading space 60 and engages about a drum 78 mounted on a shaft 79 which is journalled in bearings 80. The conveyor belt 77 also engages about a drum 81 fixed on the shaft 70.

A longitudinal conveyor 82 is disposed between the side frame members 21, and the conveyor 82 engages about a rear drum 83 mounted on a transversely disposed shaft 84. The shaft 84 has fixed thereon a beveled gear 85 which meshes with a beveled gear 86 carried by a countershaft 87 journalled in bearing 88.

Shaft 87 has fixed thereon a sprocket 89 about which a chain 90 engages, and chain 90 is trained about a sprocket 91 mounted on shaft 70.

The forward end of conveyor 82 engages about a drum 92 carried by a shaft 93, and shaft 93 is journalled through a pair of longitudinally combined side and guard plates 94 which extend lengthwise of the conveyor 82 and are rockably mounted at their rear ends on shaft 84. The forward end of the longitudinal conveyor 82 is vertically adjusted to provide for adjusting the angle of the conveyor 82 by means of a pair of hanger rods 95 which are secured at their lower ends to the guard plates 94.

The upper ends of the hanger rods 95 project through the horizontal side of angle bar 31, and a nut 96 is threaded on the upper end of each rod 95.

As shown in Figures 1 and 2, transverse conveyor 77 extends beneath longitudinal conveyor 82 and engages a lower pair of rollers 97 journalled in bearing brackets 98.

At the rear of the machine, a downwardly and inwardly inclined guide plate 99 is secured to the upper portion of the angle bars 27 so that the articles will slide downwardly from between the rollers 38 onto the transverse conveyor 67.

The forward roller shafts 57 have secured thereto sprockets 100 about which a chain 101 engages, with chain 101 engaging alternately beneath one sprocket 100 and over the next adjacent sprocket 100 so that the shafts 57 with rollers 52 will rotate in opposite directions.

The chain 101 engages about a driving sprocket 102 which is fixed to the forward end of drive shaft 70. A transversely arcuate guard or shield 103 is disposed over adjacent pairs of rollers 38 and is supported at one end by brackets 104.

A transversely arcuate shield 106 integral with shield 103 is disposed over adjacent pairs of rollers 52 and is supported at its forward or lower end by means of ears 107 secured by fastening means 108 to angle bar 30. The guards or shields 103 and 106 engage over the pairs of rollers 39 laterally of the grading space 109 which is between pairs of rollers 38.

The endmost rollers 38 have disposed longitudinally thereof upwardly and outwardly inclined guard plates 110 for preventing the articles from rolling laterally off the endmost rollers.

In the use and operation of this machine, the articles, such as potatoes, peppers, or the like, are discharged into the upper rear end of the machine onto the upper rear series of rollers 38. The smaller ones of the articles will drop through the spaces 109 between adjacent pairs of rollers 38 and the ribs 51 will assist the downward movement of the larger articles so that these larger articles will be discharged onto the lower series of inclined rollers 52.

The articles of a size to pass between rollers 52 in the grading spaces 111 will drop onto longitudinal conveyor 82 and will be discharged at the forward end of the machine. Articles which are too large to drop through the spaces 111 will be moved downwardly off of the lower ends of the lower series of rollers 52 and will then drop through the spaces 60 between the lower shafts 57.

The articles dropping through the shafts 57 will drop onto the forward transverse conveyor 77.

This machine provides a means whereby sweet potatoes may be accurately graded without injuring the potatoes thereby assisting in the rapid classifying of the potatoes as they are removed from the ground. This machine will eliminate any manual handling or grading of the potatoes and will thereby speed up the shipment of the potatoes after they have been removed from the ground.

What is claimed is:

1. In a grading machine a base frame, a pair of spaced apart angle bars above said frame at each end thereof, means fixed to said bars engaging said base frame adjustably supporting said bars, a plurality of intermediate bars, means adjustably securing said intermediate bars to said frame, a plurality of bearings secured to said angle bars, roller shafts engaging in said bearings, a plurality of upright supports carried by said intermediate bars, spaced apart grading rollers carried by said shafts, studs carried by said supports engaging in the adjacent ends of said rollers, means rotating said shafts, and transverse conveyor means below said rollers.

2. A grading machine comprising a base frame, a pair of spaced angle bars, means supporting said bars from one end of said frame, a second pair of angle bars, means supporting said second pair of angle bars from the other end of said frame, a plurality of bearings carried by said first-named pair of angle bars, a plurality of bearings carried by said second-named pair of angle bars, a plurality of intermediate transverse bars carried by said frame, a series of roller shafts journalled through said first-named bearings, a roller on each shaft, a second series of roller shafts journalled through said second-named bearings, a second series of rollers each having a diameter smaller than the diameter of the rollers in said first series on said second series of shafts, a plurality of upright supports carried by said intermediate bars, studs carried by said upright supports engaging in the ends of adjacent rollers, and means for rotating said upper and lower series of shafts.

3. A grading machine comprising a base frame, a pair of spaced angle bars, means supporting said bars from one end of said frame, a second pair of angle bars, means supporting said second pair of angle bars from the other end of said frame, a plurality of bearings carried by said first-named pair of angle bars, a plurality of bearings carried by said second-named pair of angle bars, a plurality of intermediate transverse bars carried by said frame, a series of roller shafts journalled through said first-named bearings, a roller on each shaft, a second series of roller shafts journalled through said second-named bearings, a second series of rollers each having a diameter smaller than the diameter of the rollers in said first series on said second series of shafts, a plurality of upright supports carried by said intermediate bars, studs carried by said upright supports engaging in the ends of adjacent rollers, means for rotating said upper and lower series of shafts, and a transverse conveyor beneath each series of rollers.

4. A device as claimed in claim 2, in which said second series of rollers are substantially shorter than said second series of roller shafts.

5. A device as claimed in claim 2 in which each of said rollers of said first and second series of rollers is provided with a helicoidal rib extending along the peripheral surface thereof.

References Cited in the file of this patent

UNITED STATES PATENTS

| | | |
|---|---|---|
| 932,749 | Barnett | Aug. 31, 1909 |
| 953,398 | Rogers | Mar. 29, 1910 |
| 1,090,817 | Knoerzer | Mar. 17, 1914 |
| 1,173,366 | Mackrill | Feb. 29, 1916 |
| 2,343,042 | Barry | Feb. 29, 1944 |